(No Model.)

J. J. BLACK.
VEHICLE RUNNING GEAR.

No. 461,626.        Patented Oct. 20, 1891.

WITNESSES.
Albert K. Bates
Kathrine Wolfe

INVENTOR.
John J. Black
By his attorney
E. L. Thurston

UNITED STATES PATENT OFFICE.

JOHN J. BLACK, OF CLEVELAND, OHIO, ASSIGNOR TO THE BLACK SPRING AND GEAR COMPANY, OF SAME PLACE.

VEHICLE RUNNING-GEAR.

SPECIFICATION forming part of Letters Patent No. 461,626, dated October 20, 1891.

Application filed March 23, 1891. Serial No. 386,040. (No model.)

*To all whom it may concern:*

Be it known that I, JOHN J. BLACK, a citizen of the United States, residing at Cleveland, in the county of Cuyahoga and State of Ohio, have invented certain new and useful Improvements in Vehicle Running-Gear, of which the following is a specification.

My invention relates to running-gear especially adapted to light road-wagons; and its object is to provide a cheap, light, and easy-riding spring-platform, by means of which the body may be connected with either.

My invention consists, primarily, in the combination of two springs pivotally connected with the wagon-body and means securing their outer ends to the axle with a shackle pivotally connected at its lower end with the inner ends of said springs and suitably connected at its upper end with the wagon-body, whereby the parts of the springs between their inner ends and their connection with the body become operative parts of the spring-platform.

It also consists in the construction and more specific combinations of the parts of the device hereinafter described, and especially in the form thereof which constitutes the front spring-platform, as definitely pointed out in the claims.

Figure 1:
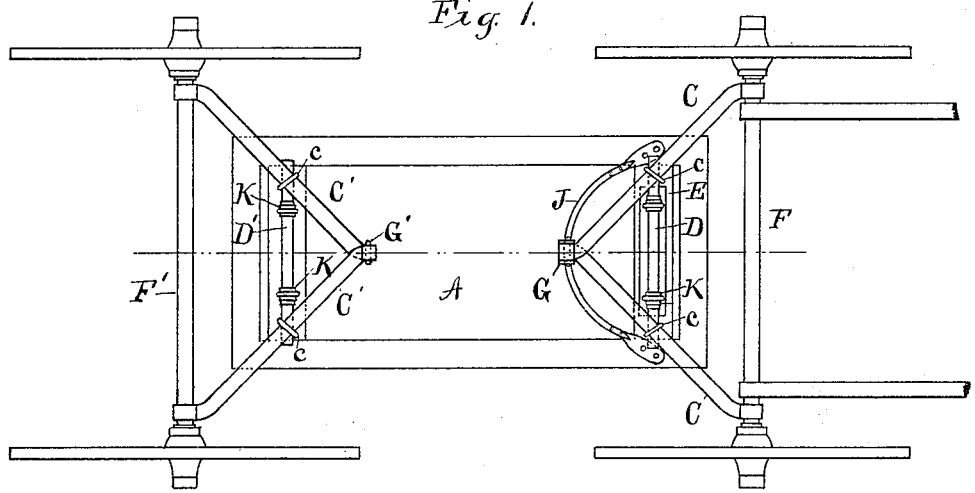
Figure 2:
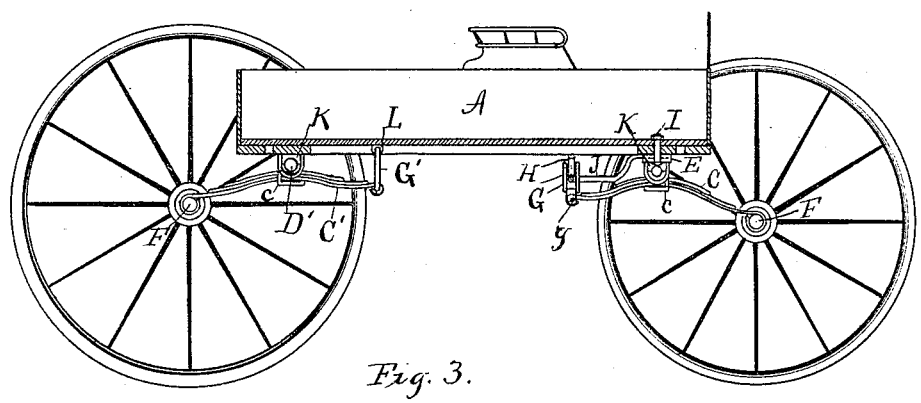
Figure 3:
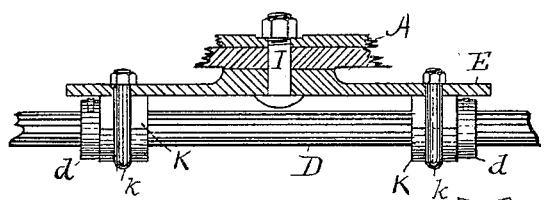
Figure 4:
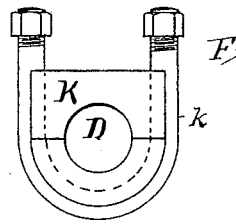
Figure 5:
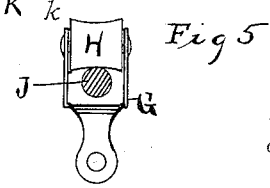

In the drawings, Figure 1 is an under side view of a wagon having my invention applied to both ends thereof. Fig. 2 is a central sectional side elevation of the same. Fig. 3 is a front view of the cross-bar D and the fifth-wheel bar E and their connection. Fig. 4 is a detached view of the boxes K. Fig. 5 is a detached view of the shackle G.

I will now proceed to describe in detail the embodiment of the invention shown in the drawings, referring to the parts by letters.

A reprerents the wagon-body and F F' the front and rear axle, respectively.

Confining our attention for the present to the front end of the wagon, C C represent two leaf-springs, the outer (front) ends of which are connected in any suitable manner with the front axle. These springs may contain as many leaves as desirable. From their points of connection with the axle the springs converge and meet beneath the wagon-body. Between their ends the springs are rigidly connected by suitable clips $c$ $c$ with a cross-bar D. This cross-bar is pivotally connected with a fifth-wheel bar E, which is in turn connected with the wagon-body by a king-bolt or other equivalent device. The springs C C at their point of meeting are bent to form an eye, and a shackle G is pivoted to the inner ends of the springs by a pivot-bolt $g$, which passes through said eye. In the upper part of this shackle is journaled a roller the axis of which is substantially at right angles to the bolt $g$. A curved bar J is secured to the under side of the wagon-body and lies beneath the roller H, its center of curvature being at the king-bolt I. This bar is most economically made of round iron, since it is especially desirable that the upper or bearing side of this bar should be convex. At the same time it is equally desirable that the face of the roller H should be concave. Thus, whatever be the position of the shackle, due to the weight of the load in the wagon-body, the roller bears upon the curved bar with a minimum of friction, and said roller will be worn down to the least possible extent.

When the wagon is loaded, the springs C C are straightened, and by reason of their loose or pivotal connection with the wagon-body, by means of the cross-bar D, the parts of the springs behind said cross-bar are also straightened, and consequently elongated. The eye in the inner ends of the springs C C is thereby thrown backward, and the shackle G tips forward from the vertical position in which it is shown; but the roller H rides freely on the curved bar J, and prevents the inner ends of the springs from moving downward.

The cross-bar D is shown in the drawings pivoted to an independent fifth-wheel bar E, and this is the construction in which the most action can be secured from the parts of the springs C C behind said cross-bar and in which the device is most durable; but if the cross-bar D were itself connected to the wagon-body by a king-bolt or other equivalent device, and this king-bolt connection were loose, this would permit a greater or less pivotal motion of the bar D and something of the same action would result, but to a less degree. At the same time there would be a constant danger of breaking the king-bolt.

Now, directing our attention to the rear spring-platform, it will be seen that the converging springs C' C' are suitably connected at their outer ends with the rear axle, and that they are also rigidly connected with a cross-bar D', which is pivotally connected with the wagon-body. The springs at their point of meeting are bent into the form of an eye, to which is pivoted a shackle G', and the upper end of this shackle is pivotally connected with a small bracket L, secured to the under side of the wagon.

Two collars $d'$ $d'$ are rigidly fixed to each of the cross-bars D D'. The boxes K K, which lie just inside and abutting against said collars, are made in two halves. These halves are held together and secured to the wagon-body or fifth-wheel bar, as the case may be, by the U-shaped clips $k$, which lie in a groove in said boxes. It is not intended that these specific means for pivoting the cross-bar shall be regarded as a material part of the invention.

Having thus described my invention, what I claim as new, and desire to secure by Letters Patent, is—

1. The combination of two converging springs connected at their forward ends to the front axle, a cross-bar extending between and connected with said springs, and suitable connections between the cross-bar and wagon-body, with a shackle pivotally connected with the rear ends of said springs, and mechanism connecting said shackle with the wagon-body, substantially as and for the purpose specified.

2. The combination of a cross-bar D, means, substantially as described, for connecting said cross-bar with the wagon-body, suitable connections between said cross-bar and the forward axle, and a spring or springs connected with said cross-bar and extending rearward, with a shackle pivotally connected with said rearwardly-extending spring or springs, a roller mounted in said shackle, and a curved bar secured to the wagon-body and lying beneath said roller, substantially as and for the purpose specified.

3. The combination of the converging leaf-springs secured at their forward ends to the forward axle, a cross-bar extending between and connected with said springs between their ends, and a fifth-wheel bar to which said cross-bar is journaled, with a shackle pivoted to the rear ends of said springs, a roller mounted in said shackle, and a curved bar secured to the wagon-body and lying beneath said roller, substantially as and for the purpose specified.

4. The combination of the springs C C, secured at their forward ends to the forward axle, a cross-bar extending between and connected with said springs and pivotally connected with a fifth-wheel device, with a shackle pivotally connected with the rear ends of said springs, a roller having a concave face mounted in said shackle, and a curved bar having a convex upper side secured to the wagon-body and lying beneath said roller, substantially as and for the purpose specified.

JOHN J. BLACK.

Witnesses:
E. L. THURSTON,
ALBERT H. BATES.